(12) United States Patent
Stevens

(10) Patent No.: US 6,870,326 B1
(45) Date of Patent: Mar. 22, 2005

(54) FLUORESCENT BALLAST WITH ISOLATED SYSTEM INTERFACE

(76) Inventor: Carlile R. Stevens, P.O. Box 8290, Horseshoe Bay, TX (US) 78657

( * ) Notice: Subject to any disclaimer, the term of this patent is extended or adjusted under 35 U.S.C. 154(b) by 0 days.

(21) Appl. No.: 10/642,941

(22) Filed: Aug. 18, 2003

Related U.S. Application Data

(63) Continuation-in-part of application No. 10/104,076, filed on Mar. 21, 2002, now Pat. No. 6,628,093.
(60) Provisional application No. 60/281,841, filed on Apr. 6, 2001.

(51) Int. Cl.$^7$ .............................................. H05B 37/02
(52) U.S. Cl. .................. 315/224; 315/200 R; 315/220; 315/277; 315/291; 315/307
(58) Field of Search ........................ 315/200 R, 209 R, 315/219–220, 224–226, 244, 246, 276–277, 291, 294, 299, 307, DIG. 5, DIG. 7, 160

(56) References Cited

U.S. PATENT DOCUMENTS

| | | | | |
|---|---|---|---|---|
| 4,277,728 A | * | 7/1981 | Stevens | .................. 315/307 |
| 5,371,439 A | * | 12/1994 | Griffin | ................... 315/209 R |
| 5,600,211 A | * | 2/1997 | Luger | ....................... 315/307 |
| 5,677,602 A | * | 10/1997 | Paul et al. | ................. 315/224 |
| 6,072,283 A | * | 6/2000 | Hedrei et al. | ............... 315/307 |
| 6,259,215 B1 | * | 7/2001 | Roman | ...................... 315/307 |
| 6,329,761 B1 | * | 12/2001 | Melis et al. | ............ 315/209 R |
| 6,696,803 B2 | * | 2/2004 | Tao et al. | .................... 315/291 |

* cited by examiner

Primary Examiner—Thuy Vinh Tran
(74) Attorney, Agent, or Firm—Roger A. Marrs

(57) ABSTRACT

A ballasting circuit is configured with a circuit having a capability of providing an isolated power supply to various external ballast accessories that interface with a circuit or device for determining the amount of illumination. The ballasting circuit also has a capability of providing isolated power for circuitry within itself such that they can be connected to communication wires external to a lighting fixture without the need of an additional power supply. The ballasting circuit includes one or more gas discharge lighting devices, a source of input power, an electronic ballasting circuit having a regulated direct current requirement and coupled between the one or more gas discharge lighting devices and the source of input power, a heater transformer, a low voltage direct current power supply, a switching device, a regulator circuit, a full wave rectifier, and windings.

4 Claims, 5 Drawing Sheets

US 6,870,326 B1

FLUORESCENT BALLAST WITH ISOLATED SYSTEM INTERFACE

This application is a continuation-in-part of U.S. application Ser. No. 10/104,076 filed Mar. 21, 2002, which is now U.S. Pat. No. 6,628,093; which claims the benefit of provisional application Ser. No. 60/281,841 filed on Apr. 6, 2001 and now abandoned therefor;

BACKGROUND OF THE INVENTION

1. Field of the Invention

The present invention relates to the field of power inverters used for electronic lighting ballast and the ability of the ballast to supply line isolated power to be used by various ballast accessories mounted external to said ballast. The isolation allows connection of devices external to the fixture in which the ballast is mounted while complying with Underwriters Laboratories Standards. The isolation is also applied to circuitry internal to the ballast to allow the ballast to be connected to a low voltage hard wired control system while meeting Underwriter's Laboratories (UL) requirements for the electrical separation of control voltage and power line voltage. A unique method of applying power at start up is also disclosed.

2. Brief Description of the Prior Art

There are many varied public domain circuits involving the generation of high frequency inputs for driving fluorescent lamps, compact fluorescent lamps, high intensity discharge and other forms of gas discharged lighting. There are a number of gas discharge lighting applications where it is desirable to adjust the amount of light generated based upon the time of day, the particular application being illuminated, energy reduction requirements based on momentary energy demand and/or user preferences. This, is often referred to, as dimming. Such a device was disclosed in my U.S. Pat. No. 4,277,728, now expired. In most cases some sort of external control system is required to tell the ballast how much light, the device it is ballasting, should be emitting based in on the some form on feedback as to how much light is measured in the illuminated area. In other cases elaborate central control systems are employed that send information to each ballast via control wire, power line carrier (PLC) or a wireless system.

Some or all of these systems require some sort of receiving or decoding device to interpret the signal and tell the ballast what to do. Systems of this sort that are normally mounted outside the ballast enclosure and must have power from some source to operate. If connections to these devices extend outside the fixture in which the ballast is mounted and are connected to some sort of low voltage wiring system or external devices that can be accessed buy unqualified personnel they must be electrically isolated from the normal AC line power. In these cases the logic power used within the ballast cannot be brought outside the ballast to power these devices. In the market place today some sort of additional power supply is provided at extra cost or, in the case of low voltage wiring systems, a separate wire or wires are provided to bring operational power to these external devices.

SUMMARY OF THE INVENTION

Accordingly, the above problems and difficulties are obviated by the present invention which incorporates a ballast with circuitry to provide an isolated source of power for external devices that interface with the means of determining the amount of illumination the ballasted fixture is to provide. This same isolated power is also using within the ballast enclosure to drive circuitry that is connected to wires that lead outside of the fixture.

OBJECTS OF THE INVENTION

Therefore, it is among the primary objects of this invention to supply a simple and easy method of energizing external devices needed to instruct the ballast as to the amount of energy to output to the gas discharge lighting device.

It is another object of this invention to supply this energy in such a manner that it is electrically isolated from the power line supplying the ballast its energy.

A further object of the invention is to provide isolated power for circuitry within the ballast such that they may be connected to communication wires external to the fixture without the need for an additional power supply.

Yet still another object of the invention is to develop reliable start up power to operate the ballast while the internal power supplies are coming up.

BRIEF DESCRIPTION OF THE DRAWINGS

The features of the present invention which are believed to be novel are set forth with particularity in the appended claims. The present invention, both as to its orginization and manner of operation, together with further objects and advantages thereof, may best be understood with reference to the following description, taken in connection with the accompanying drawings in which:

FIG. 6 also shows the 1–10 volt conversion module and the opto isolator connected to the remote control input;

OPERATIONAL DESCRIPTION OF THE PREFERRED EMBODIMENT

Figure 1:
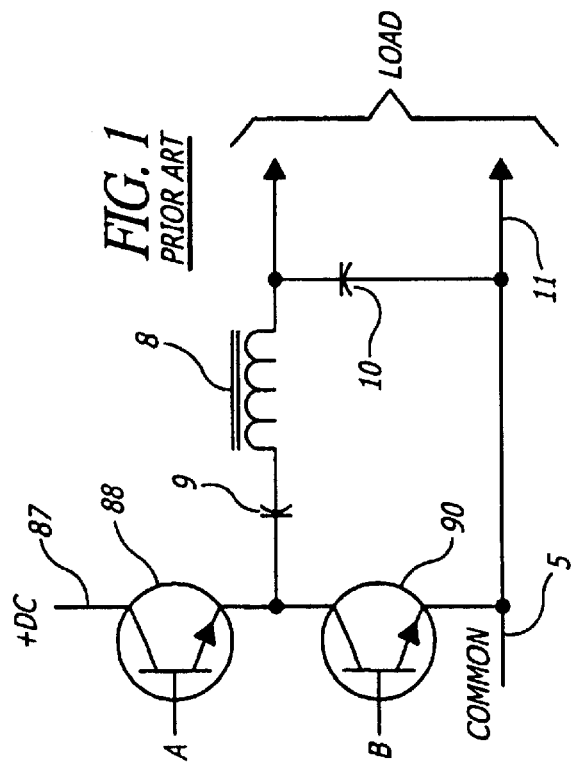
FIG. 1 shows a prior art half bridge configuration of a DC to AC inverter with switching alternately applied between points A and B to turn on switching devices 88 and 90 respectively.
Figure 2:
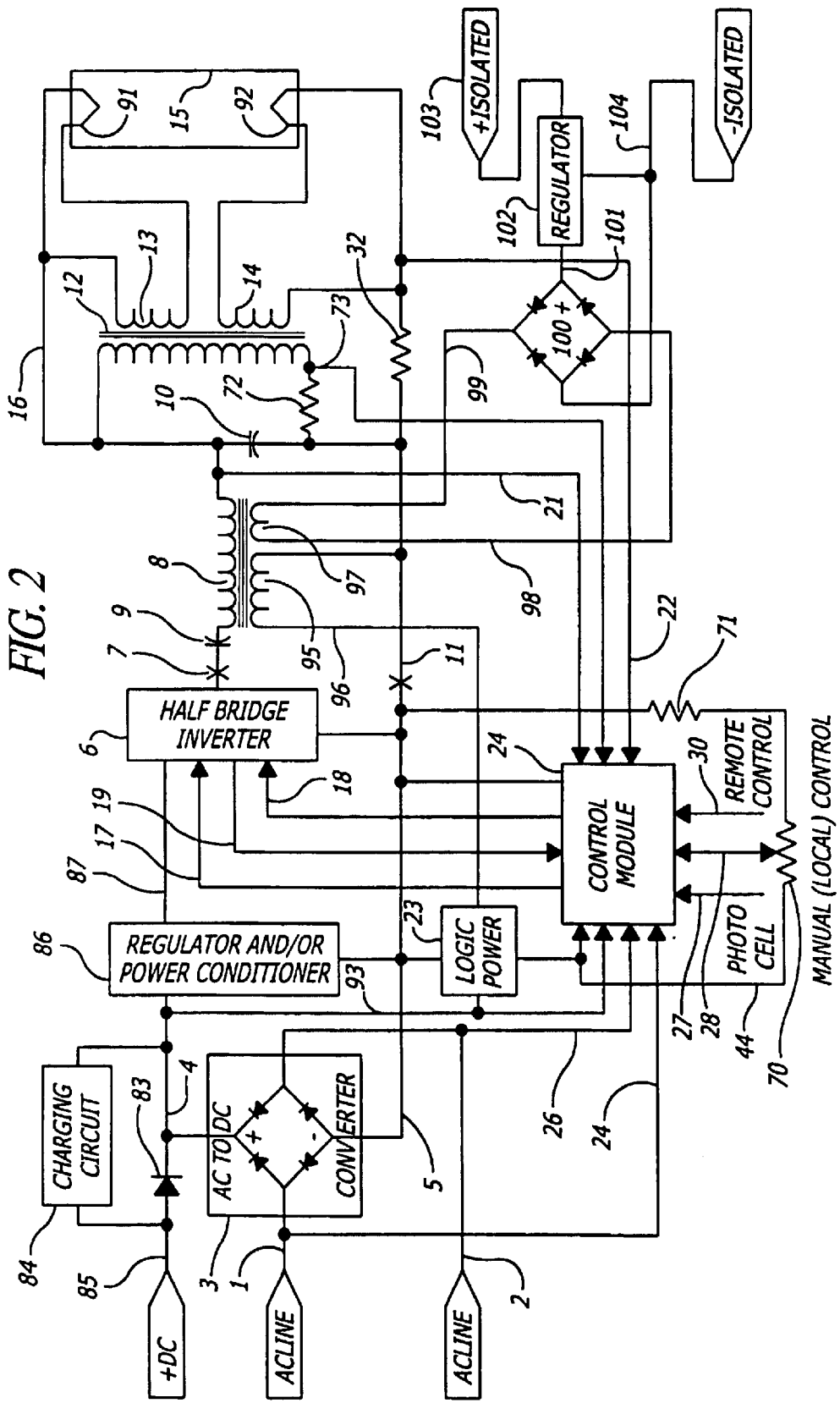
FIG. 2 is a block diagram of a preferred embodiment of the subject invention driving a gas discharge lighting device.

Referring now to FIG. 2, electrical power enters from the AC power line on lines 1 and 2 to the AC to DC converter module 3 and leaves on lines 4 and 5 plus and minus DC power. In this case the AC to DC conversion module 3 is a bridge rectifier assembly. The output of the AC to DC conversion module is supplied to Block 86 which is whatever form of public domain voltage regulator that is desired by the designer. Block 6 is the half bridge converter as shown in FIG. 1. Line 17 connects between point A of FIG. 1 and the control module 24. Line 18 connects point B of FIG. 1 to the control module. The output of the half bridge is on line 7 and connects to inductor 8 via blocking capacitor 9. It also connects to control module 24 via line 19. DC blocking capacitor 9 is large enough that its value does not enter into the resonant calculation but acts simply to pass the AC with little or no impedance while totally blocking any DC component from flowing into the load. Inductor 8 and capacitor 10 make up a series resonant circuit that converts the square wave output of the half bridge to a sine wave. This is applied to the output load in this case a gas discharge lighting device 15 by lines 16 and 11. Transformer 12 connected between lines 16 and, 11 through current sense resistor 72, across the load provides power for the lamp's heaters 91 and 92 on secondary windings 13 and 14.

Figure 4:
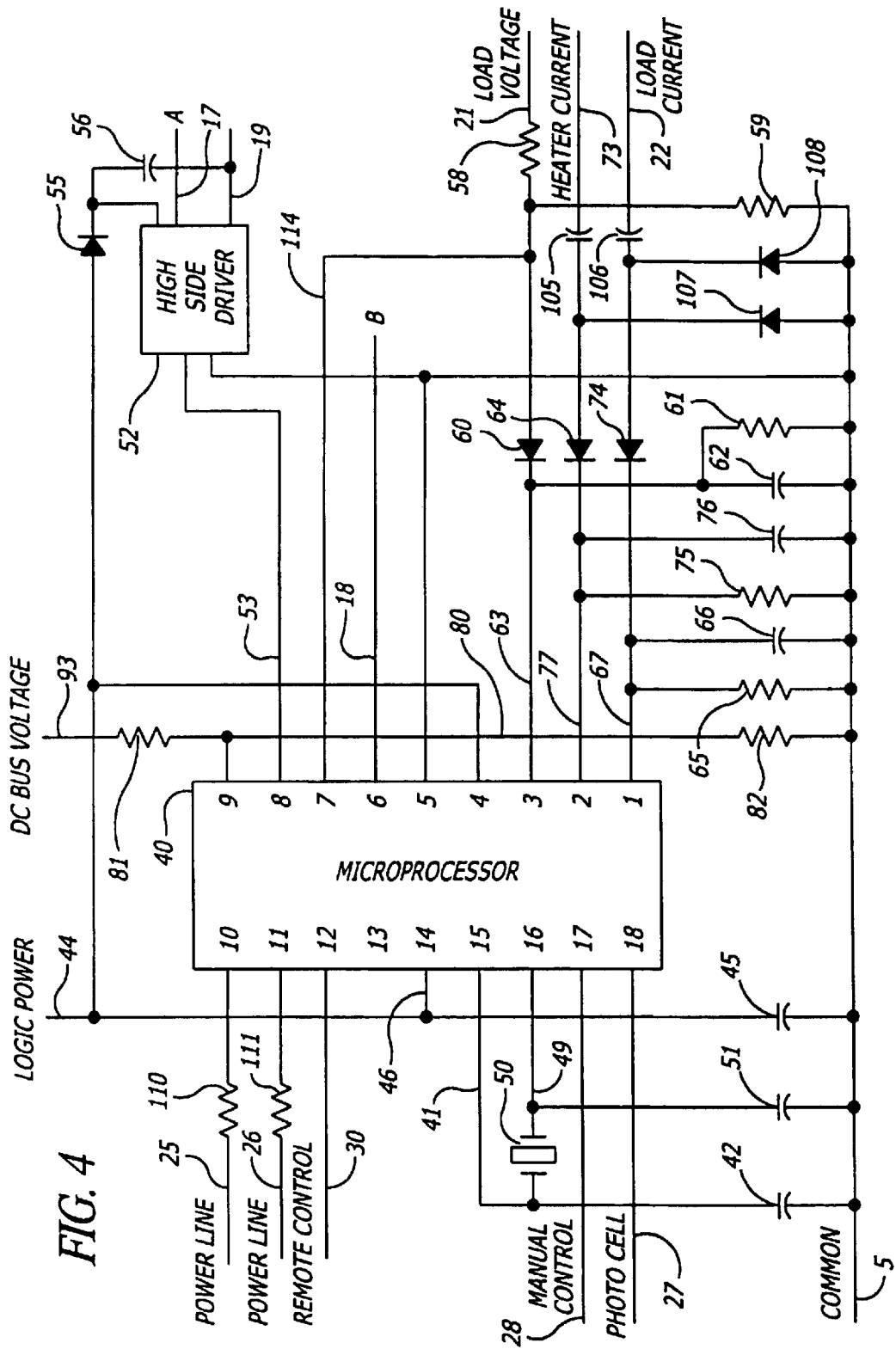
FIG. 4 is a schematic representation illustrating the connections of the microprocessor chip within the control module of FIG. 2 and FIG. 6.

Control module 24, which will be further discussed under the description of FIG. 4, receives the load current feedback from current sense resistor 32, which also may be any other form of current sensor, via line 22. Output voltage across the load is fed to the control module on line 21. This line also serves to feed back the phase angle of the sign wave that is presented across the load and may be used by the control module to maintain a resonant frequency if required. Maintaining the frequency at resonance while controlling the on time of each switch is the best way to control the light level of a flat panel display. Heater current is fed back via line 73 as a voltage drop across resistor 72 which is in series with the primary of heater transformer 12. When a power line carrier data signal is used to send control information to the control module, the signal is presented to the module through lines 25 and 26.

Photocell input which is either of the amount of light delivered by the lighting device to the surface it is illuminating and/or a series of operational input control pulses, to set the amount of light to be output by the fixture, is fed through line 30. Manual control provided by potentiometer 70 is supplied through line 28. The minimum manual setting is set by the value chosen for resistor 71 that is in series with potentiometer 70. Remote control comes in on line 27 which will be further discussed below when referring to FIG. 7.

Figure 6:
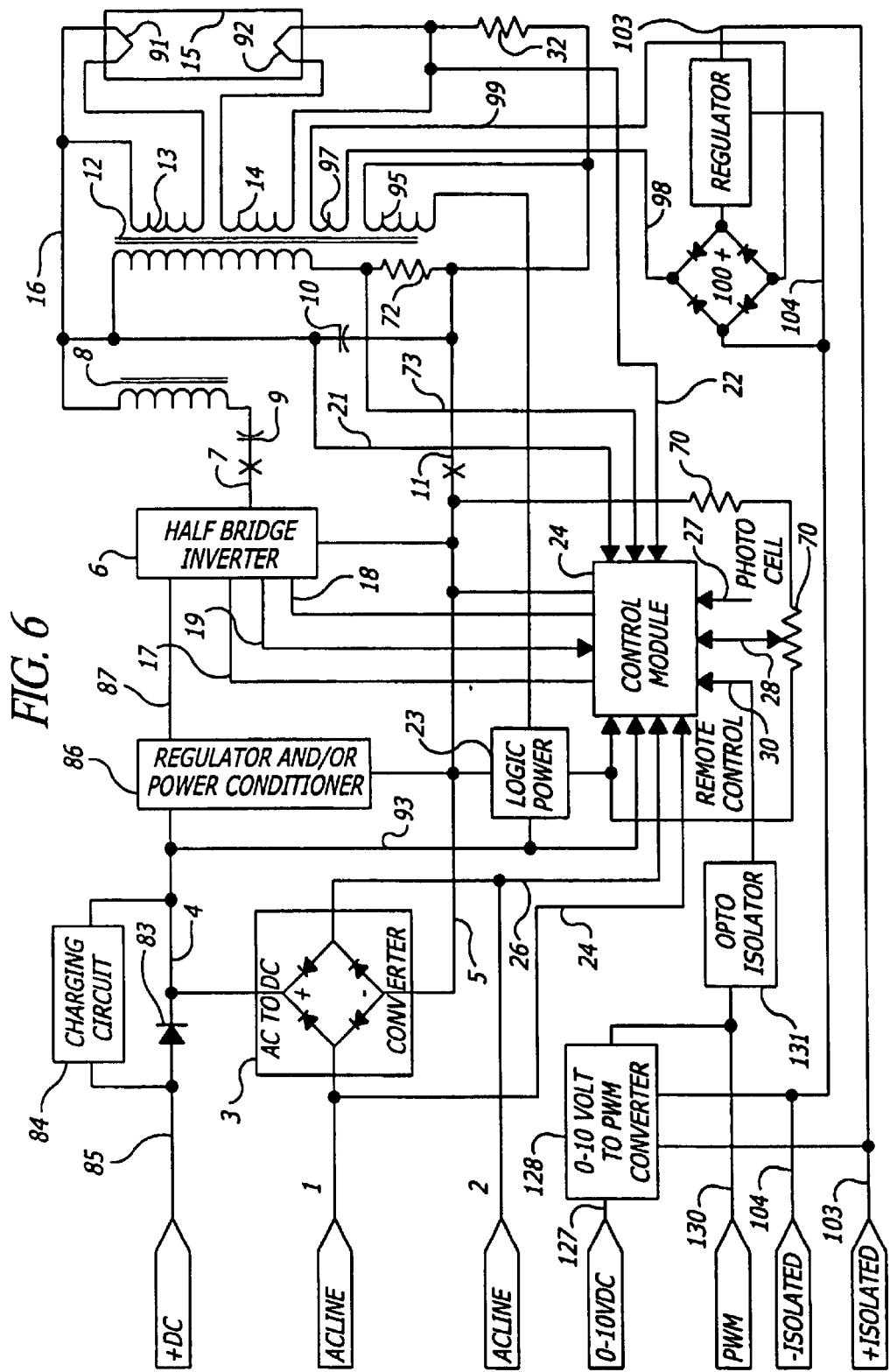
FIG. 6 is a block diagram representation of an alternate preferred embodiment of the subject invention with the logic power and isolated power supplied by windings on the heater transformer. The primary of the heater transformer is across the load.

A supply of isolated power for the operation of various external control devices is provided by tapping power from inductor 8 via secondary 97 which is connected by lines 98 and 99 to bridge rectifier 100. Winding 97 can alternately be placed as a secondary on transformer 12, as shown in FIG. 6, to accomplish the same purpose. The output of bridge rectifier 100 is fed, via line 101, to regulator 102. Line 104, connected to the (−) side of the bridge rectifier, becomes the common for this isolated supply which is output at 103.

Figure 3:
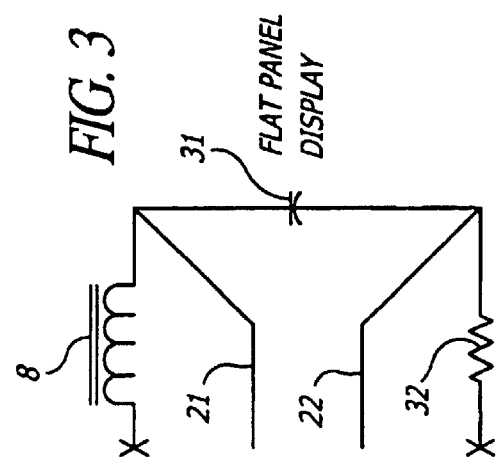
FIG. 3 depicts a change in the preferred embodiment of FIG. 2 and FIG. 6 to drive a flat panel lighting device.

Referring to FIG. 3, the connection for the electroluminescent or flat panel lighting device is shown. The two points X and X are connected in FIG. 3 where the X and X's are in FIG. 2 to replace the circuitry to the right of FIG. 2's X's. Inductor 8 is connected in the same manner, but capacitor 10 of FIG. 2 is replaced by the electro-luminescent panel itself, 31. The panel is, in fact, a large capacitor and therefore it serves not only as the load, but as the resonant capacitive element. The DC blocking capacitor 9 of FIG. 2 is not needed since the load itself is a capacitor.

Figure 5:
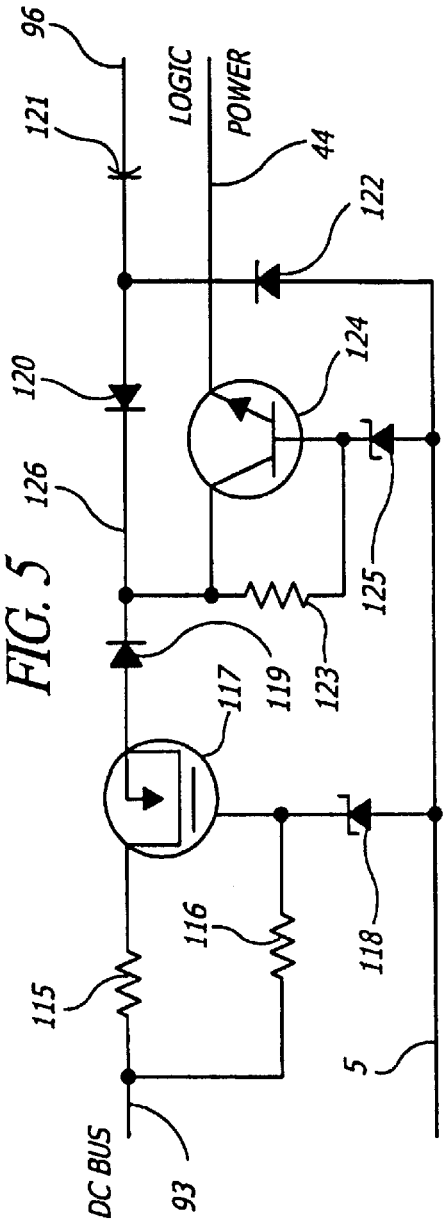
FIG. 5 is a schematic representation of the circuit within logic power module 23 of FIG. 2 and FIG. 6.

Referring now to FIG. 4, power for the microprocessor is derived from the logic power module which will be further described in the discussion of FIG. 5. The logic power is further filtered by capacitor 45 and supplied to the microprocessor at the Vdd input 14 on line 46. The operating frequency of the processor chip is set by the selection of crystal or resonator 50 which is loaded by capacitors 42 and 51 connected to the processor at the oscillator inputs 15 and 16 by lines 41 and 49. For example, when driving a flat panel display, the frequency is between 800 and 1,000 hertz. When driving a high-intensity discharge lamp, the frequency may be as high as 100 kilohertz or more. Typical fluorescent lamp applications operate in a frequency between 20 and 70 kilohertz.

The microprocessor output is at pins 6 and 8. Pin 6 is connected directly by line 18 to the drive point B to turn on the bottom transistor 90 in the half bridge of FIG. 1. Output Pin 8 is connected by line 53 to high side driver 52 to drive the top transistor 88 at point A via line 17. Since transistor 88 is not referenced to the common bus, a high side driver must be employed. Power for the high side driver needed to drive transistor 88 is supplied by charging capacitor 56 through diode 55 when the output of the bridge is low and the bottom transistor is on. This method of supplying power to a high side driver is often referred to as a bootstrap power supply.

The voltage across the output load is fed back by line 21 and divided by voltage divider resistors 58 and 59 to a voltage that is acceptable to the processor. It is then fed by line 114 to input 7 to allow the microprocessor software to determine the phase angel of the output voltage. By adjusting the frequency to maintain a 90 degree phase shift across the resonant inductor 8 the processor can be sure that the output is always at resonance. This is very useful when driving the flat panel display of FIG. 3. The voltage at the junction of resistors 58 and 59 is also rectified by diode 60 and filtered by capacitor 62 and load resistor 61 to input 3 via line 63 to allow the microprocessor to determine the output voltage magnitude. The load current is sensed by sensor 32 of FIG. 2 and is fed in via line 22 to capacitor 106 which is part of a voltage doubler consisting of capacitor 106 diode 108 and diode 74. A doubler is used so current sense resistor 32 may be reduced in size by a factor of 2 thus reducing any heat loss in the resistor. The doubled voltage is filtered by capacitor 66 and resistor 65 and presented to analog input at Pin 1 via line 67. The voltage representing the heater current is fed on line 73 to doubler consisting of capacitor 105, diode 107 and diode 64 and filtered by capacitor 76 and load resistor 75 and fed by line 77 to the microprocessor. Local control of the output power is adjusted by potentiometer 70 of FIG. 2, the wiper of which is connected at input 17 via line 28. Resistor 71 in series with potentiometer 70 sets the minimum output level. An analog input voltage from the photocell is presented by line 27 to input at Pin 18.

Remote control is connected by line 27 to the input at Pin 12. The voltage level on the direct current bus 4 is connected by line 93 and divided to a voltage acceptable to the microprocessor by a voltage divider comprised of resistors 81 and 82 interconnected by line 80. The voltage at the junction of these two resistors is presented to the microprocessor at pin 9. This allows the microprocessor to shut down operation when the supply voltage gets too low.

Referring now to FIG. 5 which is a depiction of the logic power module which supplies power to the control module on module output 44. When power is first applied to the ballast DC bus voltage is applied to FET 117 though resistors 115 and 116. Power to drive the FET 117 is applied though resistor 115 and is set by the zener diode 118. The voltage at the source of FET 117 and thus the anode of diode 119 is equal to the voltage of the zener diode 18 and the turn on voltage threshold of FET 117. Power thus flows from the DC supply via line 93 through resistor 115, FET 117 and diode 119 to regulating transistor 124. Once the ballast is operating power is supplied from winding 95 on inductor 8 via line 96. Diodes 120 and 122 and capacitor 121 make up a charge pump to supply the right amount of logic power as the voltage on winding varies over a considerable range during operation and starting of the ballast. It is also necessary that current flow both directions in all windings of inductor 8 thus a charge pump, a center tapped winding or a bridge assembly must be used. If a simple half wave rectifier were used, which would be fine with the rest of the circuit, the DC component of the current would upset for operation of the ballast.

Once the ballast is operational the DC voltage at 126, the junction of the cathodes of diodes 119 and 120, will be higher than that at the anode of 119 and therefore FET 117 will be biased off and no further current will be drawn from the DC bus. As a result small inexpensive low power components may be used as they are operational for only a few hundred milliseconds when power is first applied to the ballast. Since the voltage varies at point 126, a regulation transistor 124 must be inserted in series with point 126 and logic power output 44. Transistor 124 is driven by the current flowing through resistor 123. The logic voltage is set by the voltage zener diode 125.

Referring now to FIG. 6 which is identical to FIG. 2 with two exceptions. One, secondary windings 95 and 97 which were on inductor 8 in FIG. 2 are shown on heater transformer 12. Two, a 0–10 volt to PWM (Pulse Width Modulation) 128 converter is shown along with opto isolator 131. The 0–10 volt signal enters on line 127 and is converted to a digital PWM signal and applied to the opto isolator 131 on line 130. The output of the opto isolator 131 is connected to the control module 24 on line 30. Opto isolators are much more reliable and less expensive if they transmit only digital signals. The opto isolator provides the voltage isolation required by UL. Since the 0–10 volt conversion is on the isolated side of the opto isolator it must be powered by the isolated power supply. Power is supplied on line 103 for positive voltage and line 104 for the isolated common. An external PWM signal is input directly to the opto isolator on line 130 to control the operation of the ballast.

Figure 7:
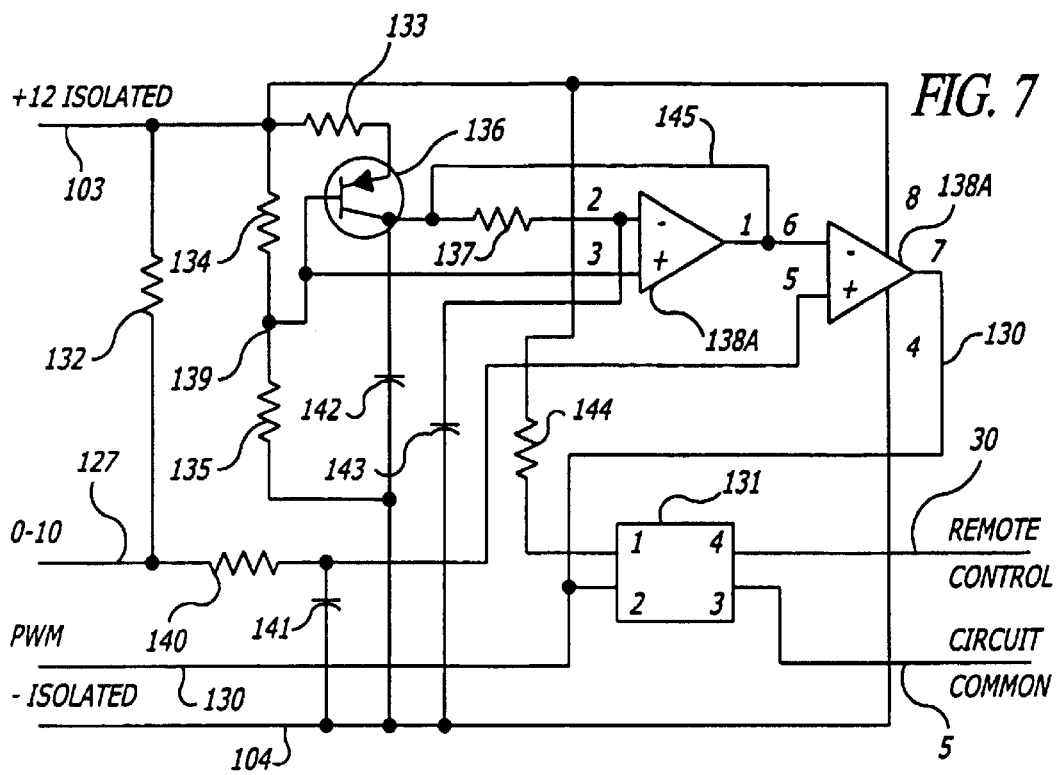
FIG. 7 is a schematic representation of the electronic circuitry within the 1–10 volt PWM conversion module and the connections to the opto isolator.

FIG. 7 is the schematic representation of circuit with in the 1–10 volt to PWM conversion module. IC 138 is a dual comparator with open collector outputs. The two sections are represented as 138A and 138B. Section 138A is configured as an oscillator that produces the saw tooth wave shown in FIG. 8(B) at Pin 1. Transistor 136 in combination with emitter resistor 133 and voltage divider consisting of resistors 134 and 135 produces a constant current at its collector. This constant current charges capacitor 142 in a linear or straight Line manner. Resistors 134 and 135 are selected such that the voltage at their junction point 139 is 10 volts. The ramping voltage on capacitor 142 is presented to the (−) input of comparator 138A and compared with the 10 volts at the (+) input. When the voltage on capacitor 141 reaches 10 volts the output of comparator 138A goes low discharging capacitor 142 via line 145. In order for comparator 138A to completely discharge capacitor 142 it must stay on long enough. Resistor 137 and capacitor 143 supply slight delay in the voltage leaving (−) input at Pin 2. Resistor 137 and capacitor 143 are very small compared to the rest of the circuit as the discharge is very rapid. It is so fast compared to the frequency of the circuit that the time for discharge is not shown in the saw tooth wave form shown in FIG. 8(B).

Figure 8:
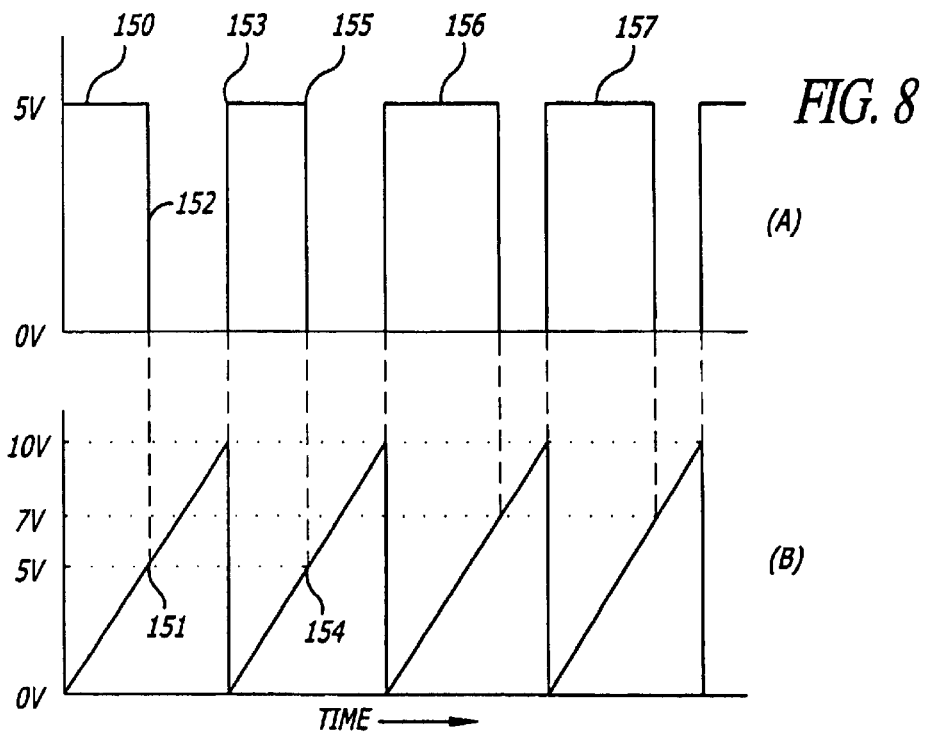
FIG. 8(A) and (B) represent the voltage wave forms of the circuit depicted in FIG. 7

Comparator 138B compares the saw tooth ramp connected at the (−) input Pin 6 with the 0–10 volt input at 127 which is connected to the (+) input at Pin 5 via resistor 140. Resistor 140 and capacitor 141 are included to filter out any noise that might be on the 0–10 volt incoming line. Otherwise they do not effect the operation of the circuit. The output of 138B of Pin 7 is high until the voltage on capacitor 142 reaches whatever voltage is at the 0–10 volt input. From that point on until the voltage on capacitor 142 reaches 10 volts the output at Pin 7 will be low. This is shown by referring to FIG. 8. Assuming that the 0–10 volt input is at 5 volts, it can be seen in graph 8A that the digital pulse 150 is high until voltage on Pin 6 reaches 5 volts, point 151, and then goes low until the ramp voltage reaches 10 volts when capacitor 143 is discharged, point 153 when it goes high again and the cycle starts over. Thus, if the 0–10 volt input is 5 volts, the duty cycle at the output Pin 7 of comparator 138B is a 50/50. In the same manner if the 0–10 volt input is at 7 volts the duty cycle of the digital output will be 30/70 as shown in FIG. 8 pulses 156 and 157.

The 0–10 volt system used in the market today requires that each ballast source some current as the controller is a current sink that maintains a fixed voltage regardless of the current it is sinking. This current is sourced by resistor 132 which is connected to the +12 volt isolated supply. Opto isolator 131 is a conventional device with a light emitting diode (LED) connected betweens Pins 1 and 2. The light turns on a diode or photo transistor connected between Pins 4 and 3. Thus isolation is achieved. Resistor 144 sets the amount of current that flows in the LED. When the 0–10 volt input is not connected resistor 132 pulls Pin 6 on comparator 138B above 10 volts thus the output on Pin 7 never goes low. Since this output is an open collector it is effectively disconnected from the circuit. Pulse width modulation (PWM) is connected directly to the opto isolator to achieve the same result in controlling the ballast.

Although the present invention has been described in connection with preferred embodiments thereof, many variations and modifications will now become apparent to those skilled in the art. It is preferred, therefore, that the present invention be limited, not by the specific disclosure herein, but only by the appended claims.

I claim:

1. A gas discharge lighting system comprising:
   one or more gas discharge lighting devices;
   a source of input power;
   a electronic ballasting circuit having a regulated direct current requirement coupled between said one or more gas discharge lighting devices and said source of input power comprising:
   an alternating-to-direct current conversion means;
   a power regulator connected to said alternating-to-direct current conversion means for converting its output to said regulated direct current required to operate said ballasting circuit;
   a controllable output direct current to alternating current inverter that operates with a substantially square wave output at a frequency above that of audible sound;
   an impedance network interposed between said inverter and said one or more gas discharge lighting devices comprising at least one resonating inductor and one capacitor to modify the substantially square wave output of said inverter to provide a proper operation of said one or more gas discharge lighting devices; and
   a controlling device that controls the operation of said inverter and thus, via said impedance network, an amount of power delivered to said one or more gas discharge lighting devices;

a heater transformer having a primary winding effectively connected across a connection between said impedance network and said one or more gas discharge lighting devices, and secondary windings as required to drive one or more heaters within said one or more gas discharge lighting devices incorporated as part of said heater transformer;

a low voltage direct current power supply to provide power to said controlling device as well as switching power to said controllable output direct current-to-alternating current inverter;

a switching device connected to an output of said alternating current-to-direct current conversion means to supply power to said low voltage direct current power supply when operation first commences; and an additional winding on said heater transformer with its output rectified to produce direct current to supply said low voltage direct current power supply after operation has commenced with said switching device, that is connected to the output of said alternating-to-direct current conversion means, biased into a non-conduction mode by the rectified output of said additional winding on said heater transformer.

2. The gas discharge lighting system as set forth in claim 1 wherein said controlling device is a microprocessor coupled to said one or more gas discharge devices to monitor their operation and interconnected with said controllable output direct current to alternating current inverter to control the output to said one or more discharge devices.

3. The gas discharge lighting system as set forth in claim 1 further comprising:

a second additional winding on said heater transformer electrically isolated from all other windings;

a full wave rectifying means connected to said second additional winding to produce an isolated direct current; and a regulator circuit to receive said isolated direct current and produce a regulated isolated direct current supply.

4. The gas discharge lighting system as set forth in claim 3 wherein said voltage to pulse width modulation conversion circuit comprises:

a PNP bipolar transistor configured with a first resistor connected between said isolated direct current supply and an emitter of said PNP bipolar transistor;

a second and third resistor connected in series between the isolated direct current supply and its common terminal, the second and third resistor having values chosen to have 10 volts at their junction, said junction connected to a base of said PNP bipolar transistor;

a first comparator having a negative input connected through a fourth resistor to a collector of said PNP bipolar transistor and a positive input connected to the junction of said second and third resistors, an output of said first comparator connected to the collector of said PNP bipolar transistor;

a first capacitor connected between the junction of the collector of said PNP bipolar transistor and said fourth resistor and a common of said isolated direct current supply; said capacitor charges at a constant rate from the constant current flowing from the collector of said PNP bipolar transistor until it reaches a level of ten volts which causes said first comparator's output to go low discharging said first capacitor via said connection for said comparator's output to the collector of said NPN bipolar transistor;

a second capacitor connected to a negative input of said first comparator and isolated direct current supply's common to assure that said first comparator stays on along enough to fully discharge said first capacitor; and a second comparator having a negative input connected to the output of said first comparator and thus presenting a saw tooth zero to ten volt wave at said second comparator negative input, the second comparator having a positive input connected to said zero to ten volt input with an output of said second comparator going high or low depending on whether the voltage at said negative input is above or below said zero to ten volt input presented at said second comparator's positive input.

* * * * *